(12) United States Patent
Rothschild

(10) Patent No.: US 8,122,466 B2
(45) Date of Patent: Feb. 21, 2012

(54) SYSTEM AND METHOD FOR UPDATING DIGITAL MEDIA CONTENT

(75) Inventor: Leigh M. Rothschild, Sunny Isles Beach, FL (US)

(73) Assignee: Portulim Foundation LLC, Wilmington, DE (US)

( * ) Notice: Subject to any disclaimer, the term of this patent is extended or adjusted under 35 U.S.C. 154(b) by 331 days.

(21) Appl. No.: 11/652,436

(22) Filed: Jan. 11, 2007

(65) Prior Publication Data

US 2007/0113264 A1 May 17, 2007

Related U.S. Application Data

(63) Continuation-in-part of application No. 11/400,889, filed on Apr. 10, 2006, and a continuation-in-part of application No. 10/034,832, filed on Dec. 28, 2001, now Pat. No. 7,503,059, and a continuation-in-part of application No. 09/997,477, filed on Nov. 20, 2001, now Pat. No. 7,711,774.

(51) Int. Cl.
*H04N 7/10* (2006.01)
*H04N 7/173* (2011.01)
*G06Q 30/00* (2006.01)

(52) U.S. Cl. ..... 725/32; 725/105; 705/14.36; 705/14.56

(58) Field of Classification Search .................. 725/105, 725/86, 32; 705/14.36, 14.56
See application file for complete search history.

(56) References Cited

U.S. PATENT DOCUMENTS

| | | | |
|---|---|---|---|
| 4,641,253 A | | 2/1987 | Mastran |
| 4,785,472 A | * | 11/1988 | Shapiro ..................... 379/93.19 |
| 5,087,980 A | * | 2/1992 | Staffer ............................ 386/66 |
| 5,119,474 A | | 6/1992 | Beitel et al. |
| 5,274,758 A | | 12/1993 | Beitel et al. |
| 5,365,579 A | * | 11/1994 | Hendrickson ............ 379/102.01 |
| 5,394,548 A | | 2/1995 | Nakajima et al. |
| 5,404,437 A | | 4/1995 | Nguyen |
| 5,430,835 A | | 7/1995 | Williams et al. |
| 5,440,677 A | | 8/1995 | Case et al. |
| 5,467,288 A | * | 11/1995 | Fasciano et al. ............... 715/716 |
| 5,479,268 A | * | 12/1995 | Young et al. .................... 386/83 |
| 5,553,221 A | | 9/1996 | Reimer et al. |

(Continued)

FOREIGN PATENT DOCUMENTS

WO  WO 9926415 A1 * 5/1999

(Continued)

OTHER PUBLICATIONS

U.S. Appl. No. 60/278,530, filed Mar. 23, 2001.*

(Continued)

*Primary Examiner* — James R Sheleheda

(57) ABSTRACT

A system and method for updating digital content are provided. The system and method of the present disclosure enable updating of content on digital media by dynamically presenting specialized selected content from a global computer network, e.g., the Internet, or other stored digital medium. The system and method provide for reading at least one identifier of at least one media content; transmitting the at least one identifier to a remote server; receiving at least one indication of updated supplemental content related to the at least one media content from the remote server; and presenting the received at least one indication to a user. In one embodiment, the at least one indication is a menu of at least one selectable item. The at least one item may be a movie preview, a movie segment, a web page, an ecommerce website, a product preview, a document or an audio file.

25 Claims, 6 Drawing Sheets

U.S. PATENT DOCUMENTS

| | | | |
|---|---|---|---|
| 5,559,949 A | 9/1996 | Reimer et al. | |
| 5,583,980 A | 12/1996 | Anderson | |
| 5,596,705 A | 1/1997 | Reimer et al. | |
| 5,624,265 A * | 4/1997 | Redford et al. | 434/307 R |
| 5,640,560 A | 6/1997 | Smith | |
| 5,642,477 A | 6/1997 | de Carmo et al. | |
| 5,675,511 A | 10/1997 | Prasad et al. | |
| 5,696,905 A | 12/1997 | Reimer et al. | |
| 5,715,400 A | 2/1998 | Reimer et al. | |
| 5,758,093 A | 5/1998 | Boezeman et al. | |
| 5,781,730 A | 7/1998 | Reimer et al. | |
| 5,808,662 A | 9/1998 | Kinney et al. | |
| 5,861,881 A | 1/1999 | Freeman et al. | |
| 5,898,429 A | 4/1999 | Trom et al. | |
| 5,973,679 A | 10/1999 | Abbott et al. | |
| 5,987,525 A | 11/1999 | Roberts et al. | |
| 6,006,241 A | 12/1999 | Purnaveja et al. | |
| 6,065,042 A | 5/2000 | Reimer et al. | |
| 6,094,671 A | 7/2000 | Chase et al. | |
| 6,118,445 A | 9/2000 | Nonomura et al. | |
| 6,173,317 B1 | 1/2001 | Chaddha et al. | |
| 6,226,655 B1 * | 5/2001 | Borman et al. | 715/501.1 |
| 6,230,172 B1 | 5/2001 | Purnaveja et al. | |
| 6,230,207 B1 | 5/2001 | Roberts et al. | |
| 6,239,801 B1 | 5/2001 | Chiu et al. | |
| 6,240,459 B1 | 5/2001 | Roberts et al. | |
| 6,240,555 B1 | 5/2001 | Shoff et al. | |
| 6,337,947 B1 | 1/2002 | Porter et al. | |
| 6,438,751 B1 * | 8/2002 | Voyticky et al. | 725/42 |
| 6,490,580 B1 | 12/2002 | Dey et al. | |
| 6,519,771 B1 * | 2/2003 | Zenith | 725/32 |
| 6,529,949 B1 | 3/2003 | Getsin et al. | |
| 6,571,392 B1 | 5/2003 | Zigmond et al. | |
| 6,580,870 B1 | 6/2003 | Kanazawa et al. | |
| 6,678,866 B1 * | 1/2004 | Sugimoto et al. | 715/203 |
| 6,757,482 B1 | 6/2004 | Ochiai et al. | |
| 6,857,130 B2 * | 2/2005 | Srikantan et al. | 725/93 |
| 6,941,383 B1 | 9/2005 | Getsin et al. | |
| 6,944,621 B1 * | 9/2005 | Collart | 707/102 |
| 6,976,265 B1 | 12/2005 | Yang et al. | |
| 7,058,889 B2 | 6/2006 | Trovato et al. | |
| 7,103,908 B2 * | 9/2006 | Tomsen | 725/141 |
| 7,120,924 B1 * | 10/2006 | Katcher et al. | 725/60 |
| 7,136,571 B1 * | 11/2006 | Dagtas | 386/68 |
| 7,143,428 B1 * | 11/2006 | Bruck et al. | 725/37 |
| 7,219,173 B2 * | 5/2007 | Sha et al. | 710/61 |
| 7,254,779 B1 | 8/2007 | Rezvani et al. | |
| 7,428,504 B2 * | 9/2008 | Song | 705/26.62 |
| 7,434,154 B2 | 10/2008 | Konetski | |
| 7,464,172 B2 * | 12/2008 | Deshpande | 709/232 |
| 7,702,536 B1 * | 4/2010 | Alabraba et al. | 705/14.16 |
| 2001/0001865 A1 | 5/2001 | Barraclough et al. | |
| 2001/0005446 A1 | 6/2001 | Uchikoga | |
| 2001/0013068 A1 | 8/2001 | Klemets et al. | |
| 2002/0016820 A1 * | 2/2002 | Du Val et al. | 709/203 |
| 2002/0046083 A1 * | 4/2002 | Ondeck | 705/14 |
| 2002/0053083 A1 | 5/2002 | Massey | |
| 2002/0053089 A1 | 5/2002 | Massey | |
| 2002/0059342 A1 | 5/2002 | Gupta et al. | |
| 2002/0077988 A1 | 6/2002 | Sasaki et al. | |
| 2002/0078144 A1 | 6/2002 | Lamkin et al. | |
| 2002/0078456 A1 * | 6/2002 | Hudson et al. | 725/60 |
| 2002/0087569 A1 | 7/2002 | Fischer et al. | |
| 2002/0089519 A1 | 7/2002 | Betz et al. | |
| 2002/0090201 A1 | 7/2002 | Betz et al. | |
| 2002/0091658 A1 * | 7/2002 | Bae | 706/62 |
| 2002/0091762 A1 | 7/2002 | Sohn et al. | |
| 2002/0106191 A1 | 8/2002 | Betz et al. | |
| 2002/0116707 A1 | 8/2002 | Morris et al. | |
| 2002/0116708 A1 | 8/2002 | Morris et al. | |
| 2002/0120925 A1 | 8/2002 | Logan | |
| 2002/0131511 A1 | 9/2002 | Zenoni | |
| 2002/0152233 A1 | 10/2002 | Cheong et al. | |
| 2002/0161462 A1 | 10/2002 | Fay et al. | |
| 2002/0161797 A1 * | 10/2002 | Gallo et al. | 707/500.1 |
| 2002/0163533 A1 | 11/2002 | Trovato et al. | |
| 2002/0173273 A1 | 11/2002 | Spurgat et al. | |
| 2002/0180803 A1 | 12/2002 | Kaplan et al. | |
| 2003/0002849 A1 * | 1/2003 | Lord | 386/46 |
| 2003/0009485 A1 | 1/2003 | Turner | |
| 2003/0018609 A1 * | 1/2003 | Phillips et al. | 707/1 |
| 2003/0026587 A1 | 2/2003 | Ostrover | |
| 2003/0035646 A1 | 2/2003 | Salvatori et al. | |
| 2003/0046189 A1 * | 3/2003 | Asayama | 705/27 |
| 2003/0070181 A1 * | 4/2003 | Holm | 725/134 |
| 2003/0088515 A1 * | 5/2003 | Cooper et al. | 705/50 |
| 2003/0113096 A1 | 6/2003 | Taira et al. | |
| 2003/0115598 A1 * | 6/2003 | Pantoja | 725/40 |
| 2003/0140090 A1 | 7/2003 | Rezvani et al. | |
| 2003/0152366 A1 | 8/2003 | Kanazawa et al. | |
| 2003/0188255 A1 | 10/2003 | Shimizu et al. | |
| 2003/0191816 A1 | 10/2003 | Landress et al. | |
| 2004/0054542 A1 | 3/2004 | Foote et al. | |
| 2004/0205830 A1 | 10/2004 | Kaneko | |
| 2004/0237084 A1 * | 11/2004 | Kurzweil et al. | 717/178 |
| 2004/0261127 A1 * | 12/2004 | Freeman et al. | 725/135 |
| 2005/0015815 A1 | 1/2005 | Shoff et al. | |
| 2005/0028195 A1 | 2/2005 | Feinleib et al. | |
| 2005/0058435 A1 | 3/2005 | Chung et al. | |
| 2005/0070361 A1 | 3/2005 | Lau et al. | |
| 2005/0091679 A1 * | 4/2005 | Tanaka et al. | 725/8 |
| 2005/0107898 A1 * | 5/2005 | Gannon et al. | 700/90 |
| 2005/0117886 A1 | 6/2005 | Kang et al. | |
| 2005/0149759 A1 * | 7/2005 | Vishwanath et al. | 713/201 |
| 2005/0152683 A1 | 7/2005 | Ryu | |
| 2005/0182828 A1 | 8/2005 | Lamkin et al. | |
| 2005/0185929 A1 | 8/2005 | Kang et al. | |
| 2005/0193322 A1 | 9/2005 | Lamkin et al. | |
| 2005/0198574 A1 | 9/2005 | Lamkin et al. | |
| 2005/0235282 A1 * | 10/2005 | Anderson | 717/178 |
| 2005/0251749 A1 | 11/2005 | Lamkin et al. | |
| 2005/0265701 A1 | 12/2005 | Lamkin et al. | |
| 2005/0278435 A1 | 12/2005 | Lamkin et al. | |
| 2005/0278729 A1 | 12/2005 | Lamkin et al. | |
| 2006/0041639 A1 | 2/2006 | Lamkin et al. | |
| 2006/0041640 A1 | 2/2006 | Lamkin et al. | |
| 2006/0053056 A1 * | 3/2006 | Alspach-Goss et al. | 705/14 |
| 2006/0077773 A1 | 4/2006 | Seo et al. | |
| 2006/0143559 A1 * | 6/2006 | Spielberg et al. | 715/512 |
| 2006/0272027 A1 * | 11/2006 | Noble | 726/27 |
| 2006/0277454 A1 | 12/2006 | Chen | |
| 2007/0067707 A1 | 3/2007 | Travis et al. | |
| 2007/0100969 A1 * | 5/2007 | Hu | 709/220 |
| 2007/0143222 A1 * | 6/2007 | Chicks et al. | 705/59 |
| 2007/0168543 A1 | 7/2007 | Krikorian et al. | |
| 2007/0180387 A1 | 8/2007 | Gravina et al. | |
| 2007/0198632 A1 | 8/2007 | Peart et al. | |
| 2008/0046925 A1 | 2/2008 | Lee et al. | |
| 2008/0046956 A1 | 2/2008 | Kulas | |
| 2008/0270570 A1 * | 10/2008 | Reed | 709/217 |

FOREIGN PATENT DOCUMENTS

| | | | |
|---|---|---|---|
| WO | WO 0215024 A1 * | 2/2002 | |

OTHER PUBLICATIONS

Final Office Action issued in U.S. Appl. No. 12/771,004 and mailed on May 5, 2011.

Non-final Office Action issued in U.S. Appl. No. 11/400,889 and mailed on May 9, 2011.

Non-final Office Action issued in U.S. Appl. No. 12/780,236 and mailed Mar. 30, 2011.

Notice of Allowance issued in U.S. Appl. No. 12/380,701 and mailed Jun. 10, 2011.

Final Office Action issued in U.S. Appl. No. 11/527,279 and mailed Jun. 21, 2010.

Non-final Office Action issued in U.S. Appl. No. 11/527,279 and mailed on Oct. 5, 2009.

Non-final Office Action issued in U.S. Appl. No. 11/716,763 and mailed on Sep. 22, 2009.

Non-final Office Action issued in U.S. Appl. No. 12/380,701 and mailed on Dec. 1, 2009.

Notice of Allowance issued in U.S. Appl. No. 12/380,701 and mailed on Jun. 16, 2010.

Restriction Requirement issued in U.S. Appl. No. 11/716,763 and mailed on Jun. 29, 2009.

US Notice of Allowance issued in U.S. Appl. No. 11/716,763 and mailed Jun. 24, 2010.
Non-final Office Action issued in U.S. Appl. No. 12/380,701 and mailed on Mar. 18, 2010.
Non-final Office Action issued in U.S. Appl. No. 10/034,832 and mailed on Feb. 22, 2007.
Final Office Action issued in U.S. Appl. No. 10/034,832 and mailed on Jul. 19, 2007.
Advisory Action issued in U.S. Appl. No. 10/034,832 and mailed on Oct. 12, 2007.
Non-final Office Action issued in U.S. Appl. No. 10/034,832 and mailed on Jan. 16, 2008.
Non-final Office Action issued in U.S. Appl. No. 10/034,832 and mailed on Jul. 21, 2008.
Notice of Allowance issued in U.S. Appl. No. 10/034,832 and mailed on Jan. 14, 2009.
Restriction Requirement issued in U.S. Appl. No. 09/997,477 and mailed on Jun. 6, 2007.
Non-final Office Action issued in U.S. Appl. No. 09/997,477 and mailed on Oct. 3, 2007.
Final Office Action issued in U.S. Appl. No. 09/997,477 and mailed on Mar. 27, 2008.
Advisory Action issued in U.S. Appl. No. 09/997,477 and mailed on Jun. 12, 2008.
Non-final Office Action issued in U.S. Appl. No. 09/997,477 and mailed on Sep. 18, 2008.
Final Office Action issued in U.S. Appl. No. 09/997,477 and mailed on Apr. 27, 2009.
Advisory Action issued in U.S. Appl. No. 09/997,477 and mailed on Jul. 6, 2009.
Non-final Office Action issued in U.S. Appl. No. 09/997,477 and mailed on Sep. 29, 2009.
Notice of Allowance issued in U.S. Appl. No. 09/997,477 and mailed on Mar. 10, 2010.
Non-final Office Action issued in U.S. Appl. No. 11/400,889 and mailed on Jun. 3, 2010.
Final Office Action issued in U.S. Appl. No. 11/400,889 and mailed on Dec. 9, 2010.
Non-final Office Action issued in U.S. Appl. No. 12/771,004 and mailed on Dec. 6, 2010.
Notice of Allowance issued in U.S. Appl. No. 11/716,763 and mailed on Nov. 24, 2010.
Final Office Action issued in U.S. Appl. No. 12/780,236 and mailed Aug. 31, 2011.
Final Office Action issued in U.S. Appl. No. 11/400,889 and mailed on Oct. 19, 2011.

* cited by examiner

SYSTEM AND METHOD FOR UPDATING DIGITAL MEDIA CONTENT

CROSS REFERENCE TO RELATED APPLICATIONS

The present application is a continuation-in-part application of U.S. Application Ser. No. 09/997,477, filed Nov. 20, 2001 entitled "INTERACTIVE, MULTI-USER MEDIA DELIVERY SYSTEM"; a continuation-in-part application of U.S. application Ser. No. 10/034,832, filed Dec. 28, 2001 entitled "METHOD OF ENHANCING MEDIA CONTENT AND A MEDIA ENHANCEMENT SYSTEM"; and a continuation-in-part application of U.S. application Ser. No. 11/400,889, filed Apr. 10, 2006 entitled "METHOD AND SYSTEM FOR SELECTIVELY SUPPLYING MEDIA CONTENT TO A USER AND MEDIA STORAGE DEVICE FOR USE THEREIN"; the contents of all of which are hereby incorporated by reference.

BACKGROUND

1. Field

The present disclosure relates generally to data processing and media playback systems, and more particularly, to a system and method for updating digital content by supplementing the content from a global computer network, e.g., the Internet, or other stored digital content.

2. Description of the Related Art

There are presently a variety of different technologies available to deliver media selections, such as audio, video, audio/video, etc. to users in an effective and beneficial format. Moreover, there is a substantial volume of material available over computerized networks, such as the Internet which may or may not be related to specific media selections. Unfortunately, although a user may independently seek out additional materials and information associated with a specific media selection, presently no specific and effective facility exits for effectively enhancing a media selection with quantities of additional updated materials, without requiring separate independent machinery and separate and independent programming on the medium itself. Indeed, such is especially the case with regard to the large amounts of media already distributed and in use by the public.

Recent technological advances have made significant strides in what may be termed, enhanced DVDs or similarly enhanced media delivery products including CD-ROMs, hard drives, digital storage devices, and the like. These existing enhancements include the embedding and/or programming of additional content onto a specific media storage medium, such as the DVD, for effective communication to the user. As a result, merchants are able to sell these various media selections while promoting substantial enhancements, which can expand the marketability of a product which may or may not have already been viewed and/or heard by the consumer at a previous time. To this end, enhanced media players are also being developed continuously to take advantage of these enhanced media selections and avoid the need to use personal computers. Specifically, these media players may include Internet connectivity and/or a variety of other features that may previously have only been available on specific computer processors which also had media delivery capabilities. While such exiting technologies are effective and beneficial for the purposes of enhancing new releases and publications of various types of media selections as indicated, they are generally incapable of providing any enhancement capability whatsoever to already distributed media selections and/or live or remotely delivered media selections, such as through a cable or satellite system. Moreover, the enhancement provided with existing technology can become somewhat stagnant since the available additional materials and types of interaction or enhancements must be pre-programmed onto the storage medium, and thereby are permanently set. Also, typical enhancements available with present technologies are often provided in the form of add-ons which are available and accessible separate and apart from the delivery of the actual media selection itself such that there is no true, direct interactivity with the actual media selection being delivered, but rather later, separate opportunities for independent access and/or retrieval of additional materials are provided.

An example of such stagnant media delivery is the case of digital optical or stored memory content for a movie, TV show, etc. This content is routinely sold by retailers usually in the form of CDs or DVDs and other fixed media for example in the form of UMD media that plays movies, etc. on the Sony PlayStation™. This content is often supplemented by promotional content such as trailer segments for upcoming movies or with other supplemental content that is often ancillary to the main content. An example of this would be for the 1997 movie Titanic released on DVD. The Internet Movie Database (located at www.imdb.com) states the commercially available DVD contains the following features:

- Commentary by: filmmaker James Cameron, various cast and crew members, two on-set historians
- 29 never-before-seen deleted scenes with optional commentary
- Alternate ending: Brock's Epiphany
- Branching viewing option to see background materials
- Production and special effects featurettes
- "Breaking New Ground" TV special
- Visual effects breakdown of the stunts These features are commonly presented to a user of a media player via a menu 10, such as that shown in FIG. 1, which is loaded onto a display of the media player after the DVD is inserted into such a player. Once the user purchases this DVD, the user is forced to view this static and, in many cases, dated content without regard to the date the user purchased the content (which may have been years after the DVD was released). The consumer would oftentimes prefer newer and more relevant content. An example of this would be following the 1997 release of the Titanic DVD there have been several new and relevant features produced on the Titanic. Yet the user has no ability to see these features and the publisher of the DVD has no ability to offer the features. Similarly, in the case of this or any digital medium that includes previews of upcoming attractions, the attractions will be stale in an older DVD. By example, if a user purchased the Titanic DVD mastered in 1997 the user would see a trailer for an upcoming 1997 or 1998 movie. This is no longer relevant to the user or publisher, who would instead desire to offer a preview trailer of a current film that is showing in the theaters or about to show in the theaters at the time the user views the DVD. Thus, there is a clear need for both the user and publisher to be able to dynamically update digital content on stored or fixed media.

SUMMARY

A system and method for updating digital content are provided. The system and method of the present disclosure enables updating of content on digital media by dynamically presenting specialized selected content from a global computer network, e.g., the Internet, or other stored digital medium.

According to one aspect of the present disclosure, a method for updating digital content over a network is provided including reading at least one identifier of at least one media content; transmitting the at least one identifier to a remote server; receiving at least one indication of updated supplemental content related to the at least one media content from the remote server; and presenting the received at least one indication to a user. The at least one indication is a menu of at least one selectable item.

In another aspect, the method further includes receiving at least one content segment from the remote server and an instruction set for updating the at least one media content with the at least one content segment; and playing the updated at least one media content. The at least one content segment is a product placement segment.

In a further aspect, the received at least one content segment is based on demographic or psychographic profiling of the user.

According to another aspect of the present disclosure, a method for updating digital content over a network is provided. The method includes receiving at least one identifier of at least one media content from at least one media player assembly; determining at least one indication of updated supplemental content related to the at least one media content from a database; and transmitting the at least one indication to the at least one media player assembly.

According to a further aspect of the present disclosure, a system for updating digital content is provided, the system including at least one media player assembly including a playback decoder module configured for playing and selectively controlling at least one media content and reading at least one identifier of the at least one media content; a communication device configure for transmitting the at least one identifier to a remote server and receiving at least one indication of updated supplemental content related to the at least one media content from the remote server; and a display configured for presenting the received at least one indication to a user. The at least one indication is a menu of at least one selectable item.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
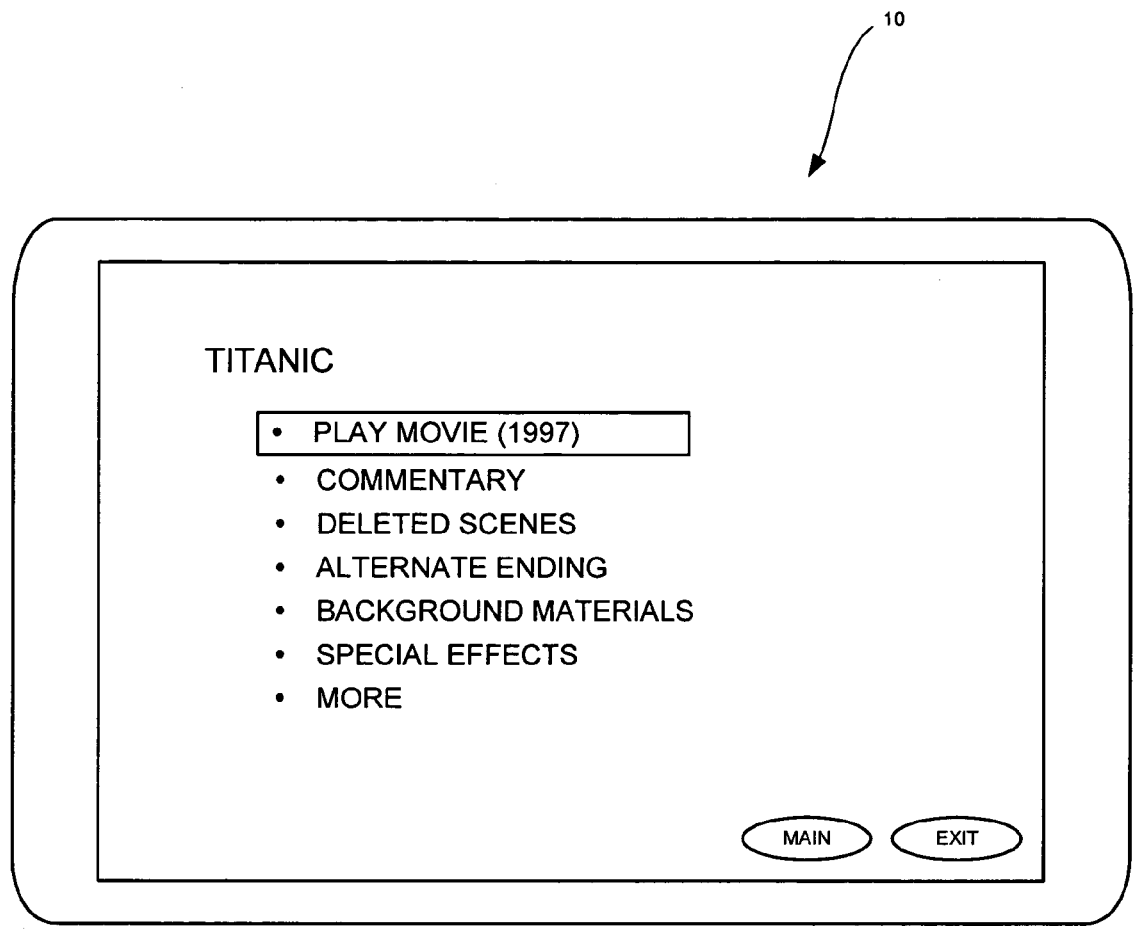
FIG. 1 is a screen shot of a menu associated with at least one digital media content.

Preferred embodiments of the present disclosure will be described hereinbelow with reference to the accompanying drawings. In the following description, well-known functions or constructions are not described in detail to avoid obscuring the present disclosure in unnecessary detail.

A system and method for updating digital content, e.g., audio, video, etc., so the digital content can be supplemented and hyperlinked to additional and fresh content are provided. The system and method of the present disclosure enables a user to obtain and/or load digital content in a media player assembly, e.g., a computer, an enhanced DVD player, etc. The content could be audio and/or video content, such as movies and other audio/video programming, as well as audio only content, such as music, or other types of developed or to be developed content. For purposes of clarity in explanation, however, a majority of the explanation may be provided in the context of a movie as the media content to be updated even though other types of media selections can be equivalently updated. The content can be transported into the media player assembly with any current or future digital storage medium including but not limited to optical media such as DVDs or CDs, removable hard disk storage medium, removable memory cards (CompactFlash, MMC, SD, Memory Stick, etc.). Alternatively, the user could use the global computer network or a local network to transport the content from a source to the media player assembly. Additionally, satellite, infrared, radio transmission of any type, or WiFi transmission can be utilized to transport the content into the media player assembly. The user will then use a user interface module (UIM) incorporating a digital playback decoding module (DPDM) to play the digital content. This playback module will allow the user to control the content including but not limited to Start, Stop, Pause, Go to, Zoom, Fast Forward, Reverse, etc. The user interface module (UIM) will present to a user a menu of updated items, e.g., supplemental content, that is available over the Internet or from another storage media. By providing the updated content from other sources, the system and method of the present disclosure will continuously update content selections presented to a user in relation to an original content selection that may have been purchased years before the presentation of the new menu selections.

It is to be appreciated that the media content to be updated utilizing the system and method of the present disclosure need not be pre-programmed or pre-configured, and special programming and/or content need not be pre-placed on the existing media storage medium for the updates to still be utilized to their fullest extent. As a result, the millions of storage media and media selections that have already been sold and are already in the possession of consumers may still be effectively enhanced utilizing the system and method of the present disclosure without requiring modification and or adaptation of those media selections. It is also understood that future media storage mediums containing media content and selections may include some or part of the features of the system and method, which are to be described, contained thereon, for convenience.

Figure 2:
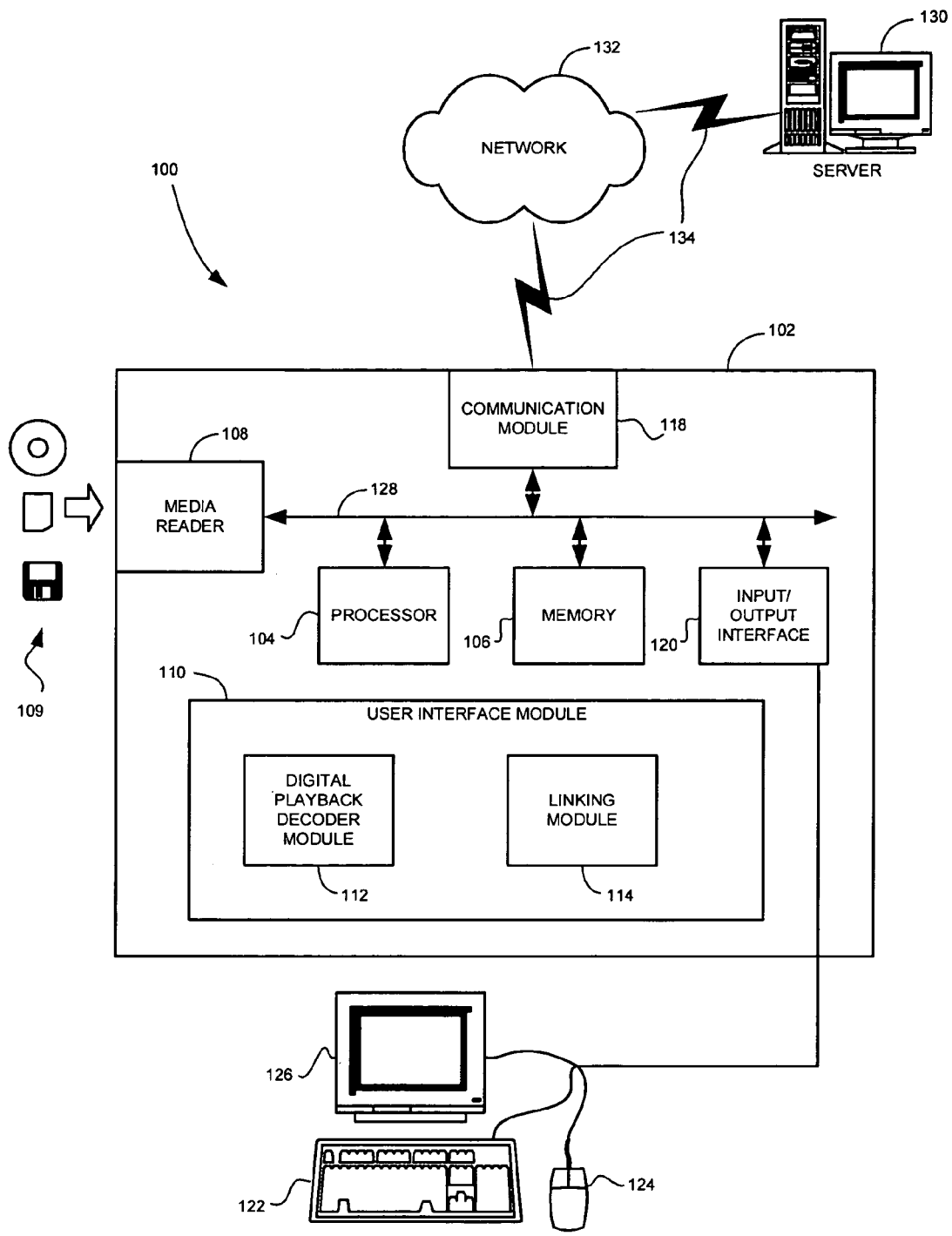
FIG. 2 is a diagram of an exemplary system for updating digital content in accordance with an embodiment of the present disclosure.

Referring to FIG. 2, a system 100 for updating digital content is illustrated. The system includes a media player assembly 102 for playing or delivering content to a user with a computer processor 104. The media player assembly 102 will also contain a digital memory storage device 106 that may be in the form of a removable or fixed hard disk device, or may be in the form of writeable memory, or may be in some other form hereto known or created in the future. The media player assembly 102 will also includes a media reader/writer 108 for reading from and writing to external storage media 109. In one embodiment of the present disclosure, the media reader 108 is a optical reader/writer (OR) that will read and process various optical media including but not limited to DVDs, CDs, CD-ROMs, and other types of optical media that may be currently available or available in the future. The optical reader/writer OR may also be able to write and store digital data. In another embodiment, the media reader 108 is a memory card reader/writer (MCR). The memory card reader (MCR) will read various removable memory including but not limited to CompactFlash, SD (Secure Digital) memory, MultiMediaCard (MMC), Memory Stick, Smart-Media and other memory currently existing or created in the future. The memory card reader (MCR) may also be able to write and store digital data.

The media player assembly 102 contains computer instructional code that is operated by the computer processor 104. This code functions to create a user interface module (UIM) 110 for navigating or playing back the digital content. The user interface module (UIM) also incorporates a digital playback decoder module (DPDM). The digital playback decoder module (DPDM) 112 is standard in the art and will playback any type of digital content currently existing including but not limited to DVR.MS files, AVI files, Mpeg (1, 2, 3, 4 5, etc) files, Tivo MPEG files, Replay files, VOB files, IFO files, AAC (audio) files, MP3 (audio) files, wmv (audio) files, Mpeg (audio) files and any digital media content file format currently existing or to be created in the future. The digital playback decoder module (DPDM) 112 allows the user to playback digital content and to selectively control the digital content. Different digital playback decoder module (DPDM) control units will have different functionality and this variance in functionality is not critical to the overall disclosure. Normal functionality will include but is not limited to instituting Play, Stop, Pause, Rewind, Fast Forward, Zoom of Video (either in a still mode or in a moving mode), freeze frame, Sound Volume up, Sound. Volume Down, Sound Muted, Go to a certain time, Go to Certain Chapter, Go to end, Go to beginning, and overlay text onto the screen or playback engine.

The user interface module (UIM) 110 also includes a linking module (LM) 114, that will allow the user to access updated content over the global computer network, e.g., the Internet, for example, a web page or pages on the global computer network (e.g., a web site). In another embodiment of the present disclosure, the linking module (LM) 114 will link to updated content in the form of either local content stored in the memory 106 or stored on external media disposed in the media reader 108, e.g., an OCR or MCR. Still another embodiment would enable the linking module (LM) 114 to link to content stored on a local computer network coupled to the media player assembly 102 via communication module 118. It is to be appreciated that the linked content may be any currently available content including but not limited to an audio file, video file, multimedia file, application file, web site or web page or any content to be developed in the future.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by a machine, e.g., media player assembly 102, comprising any suitable architecture such as a personal computer, a workstation or server. Preferably, the media player assembly 102 is implemented on a computer platform having hardware such as one or more central processing units (CPU), a random access memory (RAM), a read only memory (ROM) and input/output (I/O) interface(s) 120 such as a keyboard 122, cursor control device 124 (e.g., a mouse or joystick) and display device 126, e.g., a monitor. A system bus 128 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof which is executed via the operating system.

In addition, various other peripheral devices may be connected to the computer platform of the machine by various interfaces and bus structures, such a parallel port, serial port or universal serial bus (USB). One such peripheral device may include a communication module 118, e.g., a modem, satellite relay, wireless connection, etc., for enabling communications from the media player assembly 102 to various servers. Other peripheral devices may include additional storage devices, a printer and a scanner.

It is to be appreciated that although media player assembly 102 is shown as a desktop computer, the media player assembly 102 may include but is not limited to a laptop computer, notebook computer, personal digital assistant (PDA), game console system, cellular or other mobile phone terminal, portable or handheld gaming system, a TV set top box, a high definition receiver, or a media player, e.g., a CD player, a DVD player, or an MP3 player. In these embodiments, the media player assembly may include one or more user input devices, such as a mouse, keyboard, a touchpad, a touchscreen or a microphone (e.g., where a processor of the media player assembly executes voice recognition software and is capable of responding to voice instructions), one or more video display devices, such as a monitor, a plasma or liquid crystal display, or a television and/or one or more standalone or embedded audio output devices, such as speakers.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The media player assembly 102 may operate in a networked environment using logical connections to one or more remote computers, e.g., server 130. The remote computer may be a personal computer, a server, a router, a network PC, a peer device or other common network node, and typically includes many or all of the elements described above relative to the machine. It is to be appreciated that the network 132 may be a local area network (LAN), wide area network (WAN), the Internet or any known network that couples a plurality of computers to enable various modes of communication via network messages. The media player assembly 102 may communicate to the server 130 and network 132 via any known communication link 134, for example, dial-up, hard-wired, cable, DSL, satellite, cellular, PCS, wireless transmission (e.g., 802.11 a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
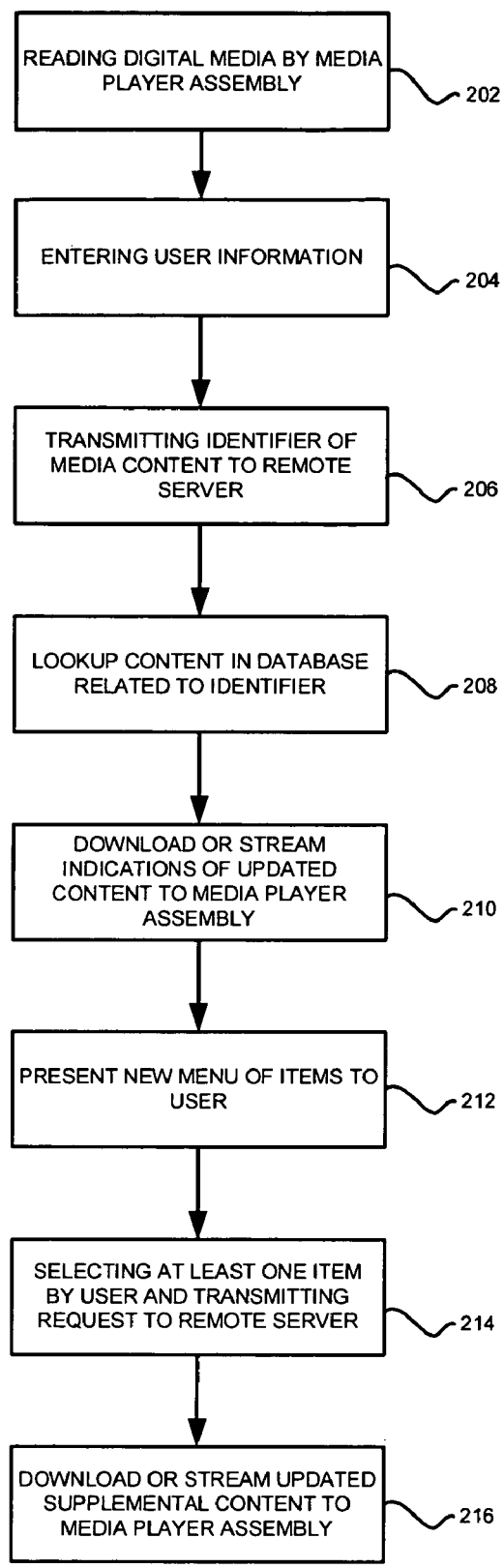
FIG. 3 is a flow chart illustrating a method for updating digital content in accordance with an embodiment of the present disclosure.

With reference to FIGS. 2 and 3, a system and method of the present disclosure will now be described, where FIG. 3 is a flow chart illustrating a method for updating digital content.

Initially, in step 202, digital content is loaded in the media player assembly 102 and the digital content is read by the media player assembly 102. In one embodiment of the disclosure, a user will insert digital content into the media reader 108. The user will then call up the user interface module (UIM) 110 which is powered by the processor 104 contained within the media player assembly 102. The user interface module (UIM) 110 will generate a user interface to control the decoder module (DPDM) 112 which will decode the content. The decoder module (DPDM) 112 will read an identifier of the digital content. In one embodiment, the identifier is the title of the content. In other embodiments, the identifier may be a serial number of the content or medium the content is disposed on, a unique code issued for the content, etc. Optionally, at step 204, a user may enter personal information to register the content, such information may include but is not limited to name, age, gender, address, phone number, e-mail address, entertainment preferences, etc.

In step 206, the identifier of the content is transmitted by the communication module 118 of the media player assembly 102 to remote server 130 via network 132. In one embodiment, the remote server 130 includes a database maintained by an originator of the content, e.g., a retailer, reseller, publisher or author. Using standard database software and computer processing power, the identifier, e.g., content title, is looked up in the database and the remote server determines if any updated supplemental content is available (step 208). The identifier is then associated by the database with other supplemental content that the publisher or originator wishes the user to view. For example, the updated supplemental content may be a preview of a movie currently in theaters, a movie segment, a web page, an ecommerce website, a product preview, a document, an audio file, marketing materials, image galleries, newsletters, sweepstakes and solicitations/offers, etc. In one embodiment, this supplemental content may be psychographically or demographically selected by using algorithms and computer processing power on the remote server that will allow the publisher of the digital media to match the user's profile (entered in step 204) to the content available that the publisher would want to present to the user. This kind of customer profiling is standard on the Internet and is well known in the art.

Figure 4A:
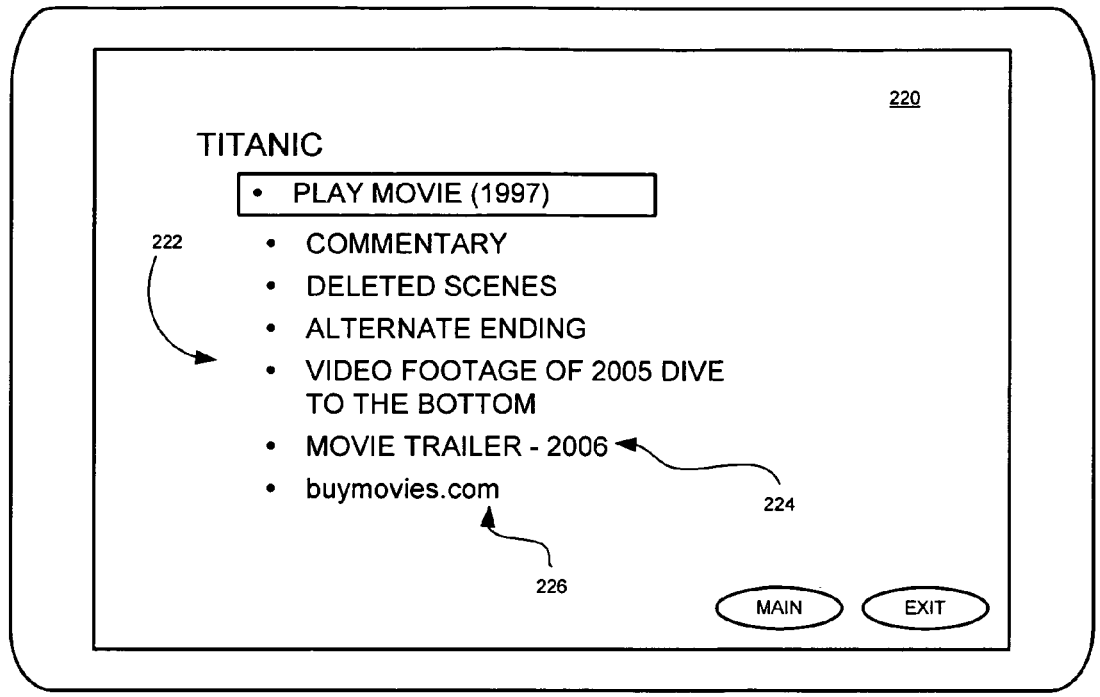
FIG. 4A is a screen shot of a menu associated with at least one digital media content in accordance with an embodiment of the present disclosure.

Using standard computer processing power, a new title menu or root menu of some type of menu is generated by the remote server 130 including indications of updated content. This menu and/or indications of the updated content are streamed or downloaded from the remote server 130 to the user's media player assembly 102 (step 210). The menu is then displayed on a display of the media player assembly 102 (step 212). An exemplary menu 220 is shown in FIG. 4A. This menu contains hyperlinks 222 to new supplemental content that the publisher wishes to offer the user. It is to be appreciated that this new menu will replace the menu that is written to the media when the media is manufactured. For example, the menu may include a link 224 to a preview of a movie that is in the movie theaters at the time the user receives the updated menu, a link to a current news story, an e-commerce web site 226 to purchase sequels and/or prequels, etc.

From the local media player assembly 102, the user can select a choice, via the various input devices described above, from this menu which will be a hyperlink to the supplemental content (step 214). The request from the user is transmitted from the media player assembly via the linking module 114 over the network 132, e.g., the Internet, to the remote server 130 or an appropriate server containing the updated content. The server(s) will then download or stream to the user the selected content request (step 216). The user will view the selected content, but at any time the user may select a hyperlink on the new menu that will allow the user to access content that may be stored on the local processor storage unit including the main content feature, or the user may select additional digital content from the remote server 130 or any other server linked to the new menu via the linking module 114 (by example a full length movie). Storage media may include a hard drive, optical media, any other kind of storage presently know or known in the future.

Figure 5:
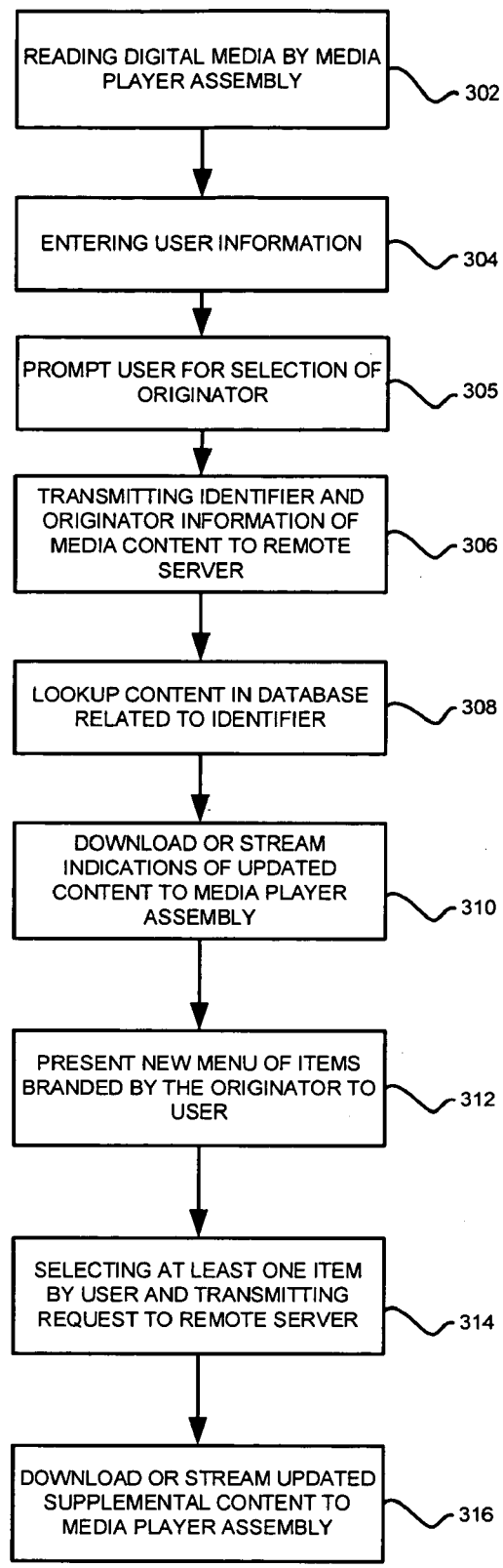
FIG. 5 is a flow chart illustrating a method for updating digital content in accordance with another embodiment of the present disclosure.

A second application of the present disclosure is for the originator, e.g., retailer/reseller, of stored digital media content (such as DVDs, CDs, or stored memory such as the movies that now play in the Sony™ Playstation, e.g., UMD media) which will now be described in relation to FIG. 5. Typically, a retailer is desirous of selling the content to the user, but then having the user stay connected (and thus reminded) of the retailer/reseller. An example of this would be a retailer who sells a user a DVD movie. The user takes the DVD home and places it into an Internet connected media player assembly such as a computer or any Internet connected DVD standalone player. In step 302, the digital content is read by the media player assembly 102. The user will then call up the user interface module (UIM) 110 which is powered by the processor 104 contained within the media player assembly 102. The user interface module (UIM) 110 will generate a user interface to control the decoder module (DPDM) 112 which will decode the content. The decoder module (DPDM) 112 will read an identifier of the digital content. In one embodiment, the identifier is the title of the content. In other embodiments, the identifier may be a serial number of the content or medium the content is disposed on, a unique code issued for the content, etc. Optionally, at step 304, a user may enter personal information to register the content, such information may include but is not limited to age, sex, address, preferences, etc.

In step 306, the user is prompted to enter purchase information on the DVD to commence playing the DVD. The user is then asked to input where they purchased the product, e.g., a retailer. This list of retailers can be preloaded as part of the digital media or DVD, and may be updated by the remote server 130 and sent to the media player assembly and stored in memory on the media player assembly as new retailers appear or disappear.

In step 306, the identifier of the content and the selected originator or retailer information are transmitted by the communication module 118 of the media player assembly 102 to remote server 130 via network 132. In one embodiment, the remote server includes a database maintained by an originator of the content, e.g., a retailer, reseller, publisher or author. Using standard database software and computer processing power, the identifier, e.g., content title, is looked up in the database and the remote server 130 determines if any updated supplemental content is available (step 308). The identifier is then associated by the database with other supplemental content that the publisher or originator wishes the user to view. For example, the updated supplemental content may be a preview of a movie currently in theaters, a movie segment, a web page, an ecommerce website, a product preview, a document or an audio file. In one embodiment, this supplemental content may be psychographically or demographically selected by using algorithms and computer processing power on the remote server that will allow the publisher of the digital media to match the user's profile (entered in step 304) to the content available that the publisher would want to present to the user. This kind of customer profiling is standard on the Internet and is well known in the art. The selected supplemental content is further refined based on the selected retailer, e.g., originator of the content.

Figure 4B:
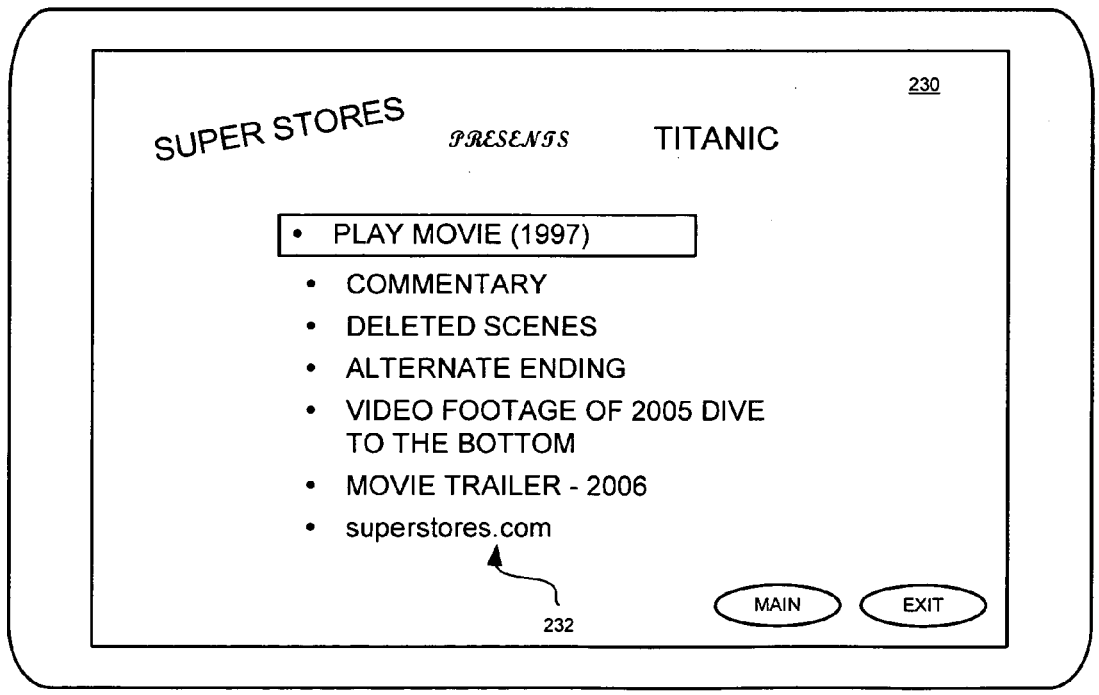
FIG. 4B is a screen shot of a menu associated with at least one digital media content in accordance with another embodiment of the present disclosure.

Using standard computer processing power, a new title menu or root menu of some type of menu is generated by the remote server 130 including indications of the updated content. This menu and/or the indications of the updated content are streamed or downloaded from the remote server 130 to the user's media player assembly 102 (step 310). The menu is then displayed on a display of the media player assembly 102 (step 312) and the user is presented with a DVD that is presented or sponsored by the retailer and can include an opening title menu that was created by the retailer/reseller and may also include supplemental information provided by the retailer. A more granular example would be for a DVD that is purchased at a retailer named "SUPER STORES" and when the user plays the DVD the main menu states "SUPER STORES PRESENTS TITANIC" and then the retailer "SUPER STORES" also offers supplemental content specifically tailored for the customer. An exemplary menu 230 is shown in FIG. 4B. This content could include ecommerce opportunities via the retailers website 232. By example, the retailer could offer a menu choice that would allow the user to purchase additional DVDs that are similar to the subject DVD. Of course, the ecommerce opportunities could be for any product that the retailer wanted to offer.

From the local media player assembly, the user can select a choice, via any of the various input devices described above, from this menu which will be a hyperlink to the supplemental content (step 314). The request from the user is transmitted from the media player assembly 102 via the linking module 114 over the network 132, e.g., the Internet, to the remote server 130 or an appropriate server containing the updated content, e.g., an ecommerce website, content provider, etc. The server(s) will then download or stream to the user the selected content request (step 316). The user will view the selected content, but at any time the user may select a hyperlink on the new menu that will allow the user to access content that may be stored on the local processor storage unit including the main content feature, or the user may select additional digital content from the remote server 130 or any other server linked to the new menu via linking module 114 (by example a full length movie).

In another embodiment of the present invention, the originator, e.g., retailer, may decide that once the user selects the retailer then the user's digital medium may only be associated with the originally selected retailer on future playbacks of the media. In this case, once the user inputs the retailer information, this information is sent via the network 132 to the remote server 130 and the database on the server. The remote server 130 will send an instruction set to the local media player assembly 102, e.g., a software applet, that tells the user's media player assembly 102 that from that point forward (i.e., upon subsequent playing of the content) once the media player assembly 102 reads the identifier, e.g., title, of the media content, that the specific content should only be associated with the content that the selected retailer is offering and that the user should henceforth not be given a choice in selecting another retailer to be associated with the digital media. In other words, upon subsequent playing of the media content, the user will be presented with the menu selected by the originator, e.g., the branded menu, without accessing the remote server 103 or the Internet.

Figure 6:
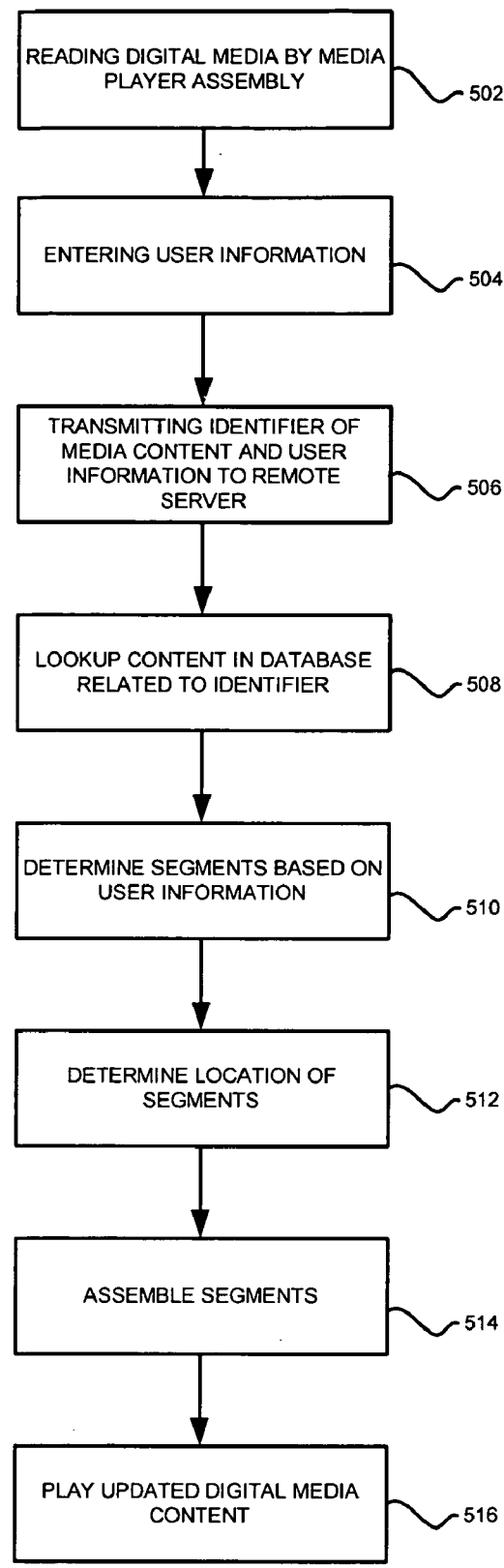
FIG. 6 is a flow chart illustrating a method for updating digital content in accordance with a further embodiment of the present disclosure.

In a further embodiment of the present disclosure, the system and method will enable the originator, e.g., the publisher, retailer, reseller, etc., of the stored digital content to create product placements within the stored digital content that are demographically or psychographically generated. For example, a user purchases a DVD or other stored digital content, takes the DVD home and places it into a network connected media player assembly such as a computer or any Internet connected DVD standalone player. The user now views the content, but the content is presented with assembled pieces that the originator or publisher determines are appropriate for the user. By example for a 36 year old married women in California, a line of beauty products are featured as part of the digital content. For a 20 year old college student an Apple iPod™ is prominently featured as part of the digital content. This content would not be ancillary or supplemental to the user but instead would be totally integral/seamless/invisible to the user and the user would probably not even know that a product placement or placements have occurred and that the placement was tailored to the user. The content (i.e., segments) selected would be demographically and psychographically tailored specifically to the user by using algorithms and computer processing power and then the assembled segments are dynamically arranged. An instruction set of how to assemble the segments is then sent by the remote server 130 to the user's media player assembly 102. This embodiment will now be described in more detail in relation to FIG. 6.

Initially, in step 502, digital content is loaded in the media player assembly 102 and the digital content is read by the media player assembly 102. The user will then call up the user interface module (UIM) 110 which is powered by the processor 104 contained within the media player assembly 102. The user interface module (UIM) 110 will generate a user interface to control the decoder module (DPDM) 112 which will decode the content. The decoder module (DPDM) 112 will read an identifier of the digital content. In one embodiment, the identifier is the title of the content. In other embodiments, the identifier may be a serial number of the content or medium the content is disposed on, a unique code issued for the content, etc. At step 504, a user may enter personal information to register the content, such information may include but is not limited to name, age, gender, address, phone number, e-mail address, entertainment preferences, etc.

In step 506, the identifier of the content and the user information is transmitted by the communication module 118 of the media player assembly 102 to remote server 130 via network 132. In one embodiment, the remote server includes a database maintained by an originator of the content, e.g., a retailer, reseller, publisher or author. Using standard database software and computer processing power, the identifier, e.g., content title, is looked up in the database and the remote server 130 determines if any product placement segments are available (step 508). The identifier is then associated by the database with other supplemental content that the publisher or originator wishes the user to view. The product placement segments and/or supplemental content will be psychographically or demographically selected by using algorithms and computer processing power on the remote server that will allow the originator or publisher of the digital media to match the user's profile (entered in step 504) to the content available that the originator or publisher would want to present the user.

Using standard computer processing power, the product placement segments that the publisher has determined are appropriate for the user, based on the user's profile, are arranged in the order that they are to be presented to the user (step 510). The segments will include any type of digital content currently existing including but not limited to DVR.MS files, AVI files, Mpeg (1, 2, 3, 4 5, etc) files, Tivo MPEG files, Replay files, VOB files, IFO files, AAC (audio) files, MP3 (audio) files, wmv (audio) files, Mpeg (audio) files and any digital media content file format currently existing or to be created in the future. An instruction set is created on how to assemble the segments with the original media content, e.g., a motion picture, on the storage medium. For example, if a motion picture has ten chapters and each chapter has five scenes, a selected segment may replace an individual scene or may be appended to a scene. In one embodiment, the instruction set will include a timeline of the motion picture or content, e.g., an elapsed time counter, total number of frames, etc., and the timeline will include indications or flags where the product placement segments are to be inserted, e.g., at a specified time or specified frame. The remote server 130 will determine which of the files are already resident and stored on the digital media (by example on the DVD, CD, or PSP/UMD formats) and which files are available and stored on the remote server 130 or other appropriate servers, e.g., content providers (step 512). The files that are stored on the remote server(s) will be downloaded from the remote server(s) via the network to the digital media player assembly, or streamed from the remote server(s). The instruction set will also be transmitted to the media player assembly 102. Once downloaded or streamed, the files may be stored in local memory associated with the local media player assembly (including hard drives, flash memory, optical memory, computer RAM memory, etc) and assembled in order for presentation according to the instruction set (step 514).

The files that are sent from the remote server will be presented to the user with the other files stored on the digital medium (DVD, CD, PSP/UMD) in the order selected by the remote server via the instruction set. Once the files are completely assembled, they will constitute as a sum of all the individual files, i.e., the entire content set. The files may be of varying length since the supplemental files comprising the product placement will probably be quite small as compared to the main content files. The entire content set may then be played back to the user (step 516). Alternatively, the segments may be contemporaneously updated, or inserted, while the content is playing instead of assembling the entire content set before playing, as described above.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for updating digital content over a network comprising:
    reading, with a media player assembly, at least one identifier of at least one media content disposed on a portable storage medium, wherein the portable storage medium includes a static menu listing at least one selectable item disposed on the portable storage medium in addition to the at least one media content;
    prompting a user to select an originator of the at least one media content from a list of retailers that is preloaded onto the portable storage medium;
    transmitting the at least one identifier and the selected originator information from the media player assembly to a remote server;
    receiving at the media player assembly at least one indication of supplemental content related to the at least one media content from the remote server;
    updating the menu to include the at least one indication, wherein the supplemental content includes branding information from the selected originator;
    receiving an instruction code from the remote server, wherein the instruction code instructs the media player assembly to not prompt the user to select the originator for any subsequent playback of the at least one media content, and wherein the instruction code updates the menu with information from the selected originator upon subsequent playing of the at least one media content; and
    presenting the menu on a display device coupled to the media player assembly.

2. The method as in claim 1, wherein the supplemental content includes a movie preview, a movie segment, a web page, an ecommerce website, a product preview, a document or an audio file.

3. The method as in claim 1, further comprising transmitting user information to the remote server, wherein the supplemental content is based on demographic or psychographic profiling of the user.

4. The method as in claim 1, wherein the supplemental content is selected by the originator.

5. The method as in claim 4, wherein the originator is a retailer, reseller, publisher or author.

6. The method as in claim 4, wherein the instruction code presents the supplemental content selected by the originator upon subsequent playing of the at least one media content without accessing the remote server.

7. The method as in claim 1, wherein the instruction code is a software applet.

8. The method as in claim 1, further comprising:
    receiving at least one content segment from the remote server and an instruction set for updating the at least one media content with the at least one content segment; and
    playing the updated at least one media content.

9. The method as in claim 8, wherein the at least one content segment is a product placement segment.

10. The method as in claim 9, further comprising transmitting user information to the remote server, wherein the received at least one content segment is based on demographic or psychographic profiling of the user.

11. The method of claim 1, further comprising receiving, from the remote server, an update to the list of retailers that is preloaded onto the portable storage medium.

12. The method of claim 11, wherein the update removes one or more retailers from the list of retailers.

13. The method of claim 11, wherein the update adds one or more retailers from the list of retailers.

14. A system for updating digital content, the system comprising:
    at least one media player assembly comprising:
        a playback decoder module configured to play and selectively control at least one media content and to read at least one identifier of the at least one media content, wherein the at least one media content is disposed on a portable storage medium, wherein the portable storage medium includes a static menu listing at least one selectable item disposed on the portable storage medium in addition to the at least one media content;
        an interface configured to prompt a user to select an originator of the at least one media content from a list of retailers that is preloaded onto the portable storage medium;
        a communication device configured to transmit the at least one identifier and the selected originator information to a remote server and to receive at least one indication of supplemental content related to the at least one media content from the remote server;

wherein the playback decoder module is further configured to update the menu to include the at least one indication, wherein the supplemental content includes branding information from the selected originator;

wherein the communication device is further configured to receive an instruction code from the remote server, wherein the instruction code instructs the at least one media player assembly to not prompt the user to select the originator for any subsequent playback of the at least one media content, and wherein the instruction code updates the menu with information from the selected originator upon subsequent playing of the at least one media content; and wherein the interface is further configured to present the menu on a display device coupled to the at least one media player assembly.

15. The system as in claim 14, where the supplemental content includes a movie preview, a movie segment, a web page, an ecommerce website, a product preview, a document or an audio file.

16. The system as in claim 14, wherein the communication device is further configured to transmit user information to the remote server, wherein the remote server is configured to determine the supplemental content based on demographic or psychographic profiling of the user.

17. The system as in claim 14, wherein the supplemental content is selected by the originator.

18. The system as in claim 17, wherein the originator is a retailer, reseller, publisher or author.

19. The system as in claim 17, wherein the instruction code presents the supplemental content selected by the originator upon subsequent playing of the at least one media content without accessing the remote server.

20. The system as in claim 19, wherein the instruction code is a software applet.

21. The system as in claim 14, wherein the remote server is configured to:

determine at least one content segment;

generate an instruction set for updating the at least one media content with the at least one content segment; and transmit the at least one content segment and the instruction set to the at least one media player assembly.

22. The system as in claim 21, wherein the playback decoder module is configured to play the updated at least one media content.

23. The system as in claim 22, wherein the at least one content segment is a product placement segment.

24. The system as in claim 23, wherein the at least one content segment is selected based on demographic or psychographic profiling of the user.

25. A non-transitory computer-readable medium having instructions stored thereon, the instructions comprising:

instructions for reading at least one identifier of at least one media content disposed on a portable storage medium, wherein the portable storage medium includes a static menu listing at least one selectable item disposed on the portable storage medium in addition to the at least one media content;

instructions for prompting a user to select an originator of the at least one media content from a list of retailers that is preloaded onto the portable storage medium;

instructions for transmitting the at least one identifier and the selected originator information from a media player assembly to a remote server;

instructions for receiving at the media player assembly at least one indication of supplemental content related to the at least one media content from the remote server;

instructions for updating the menu to include the at least one indication, wherein the supplemental content includes information from the selected originator;

instructions for receiving an instruction code from the remote server, wherein the instruction code instructs the at least one media player assembly to not prompt the user to select the originator for any subsequent playback of the at least one media content, and wherein the instruction code updates the menu with information from the selected originator upon subsequent playing of the at least one media content; and instructions for presenting the menu on a display device coupled to the media player assembly.

\* \* \* \* \*

UNITED STATES PATENT AND TRADEMARK OFFICE
CERTIFICATE OF CORRECTION

| | |
|---|---|
| PATENT NO. | : 8,122,466 B2 |
| APPLICATION NO. | : 11/652436 |
| DATED | : February 21, 2012 |
| INVENTOR(S) | : Rothschild |

Page 1 of 1

It is certified that error appears in the above-identified patent and that said Letters Patent is hereby corrected as shown below:

Page 3, item (56), under "Other Publications", in Column 1, Line 1, delete "US Notice" and insert -- Notice --.

Signed and Sealed this
Seventh Day of August, 2012

David J. Kappos
*Director of the United States Patent and Trademark Office*